June 6, 1939.    G. W. WISE    2,161,215
WATER CURRENT MOTOR
Filed June 1, 1936
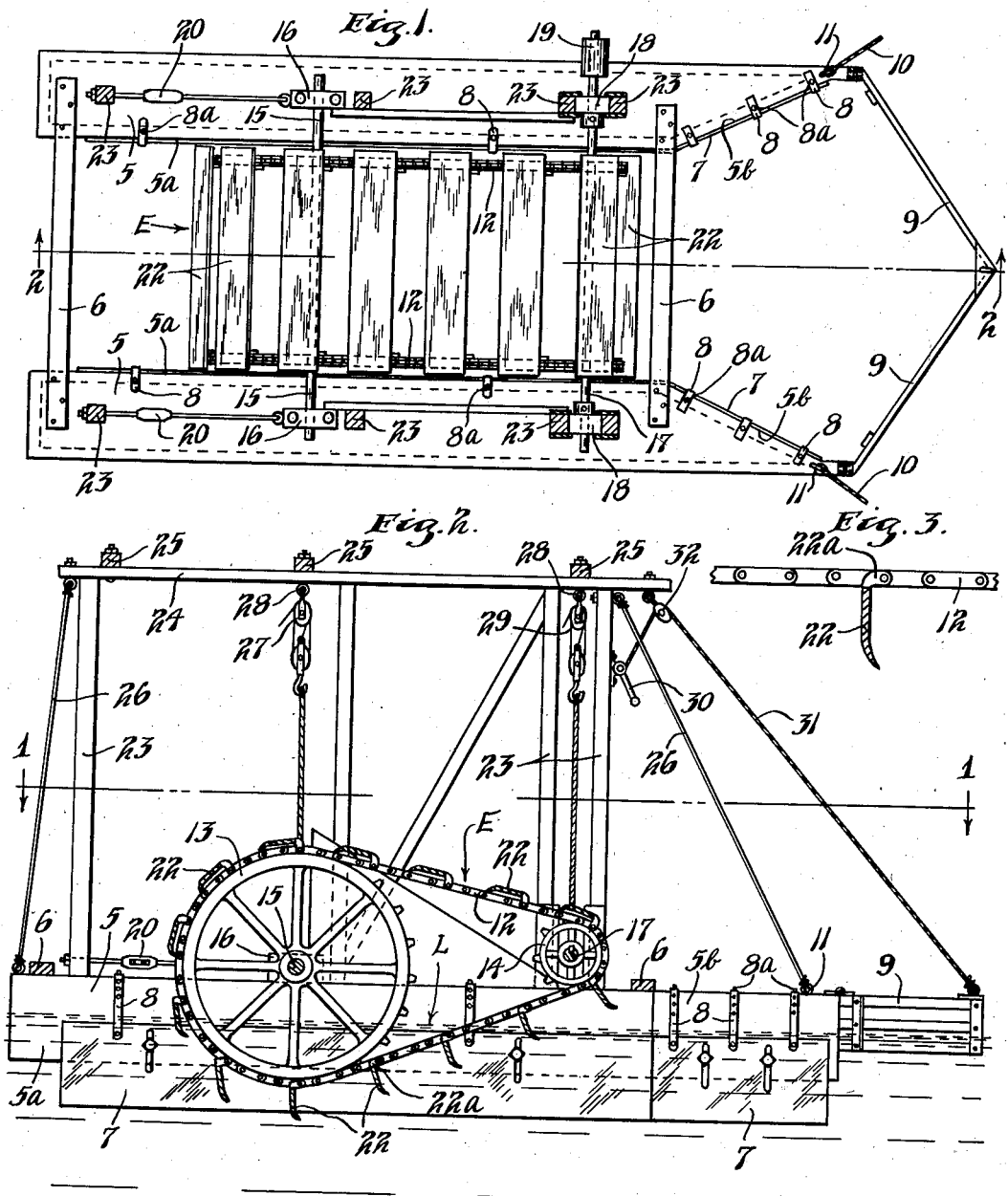
INVENTOR.
GEORGE W. WISE.
BY HIS ATTORNEYS.
Williamson & Williamson Patented June 6, 1939

2,161,215

UNITED STATES PATENT OFFICE 2,161,215

WATER CURRENT MOTOR

George W. Wise, Williston, N. Dak.

Application June 1, 1936, Serial No. 82,698

1 Claim. (Cl. 170—86)

This invention relates to water current motors and particularly to current motors which include a buoyant body designed to collect and form a sluice-way for the moving water of a stream and which are capable of being moored or moved from place to place in a stream.

It is an object of my invention to provide a simple but highly efficient water current motor of the type described wherein the buoyant body defines side walls of a sluice as well as converging collecting walls to assist in causing a moving stream of water to flow through the sluice.

It is a further object to provide in a motor of the class described an endless current-actuated element mounted in a floating sluice and equipped with a series of transverse paddles and having a current-actuated run disposed in the most efficient manner for receiving power from the moving stream.

Another object is the provision of a current motor of the buoyant body type wherein adjustable means are provided for collecting and guiding into a sluice-way a moving stream of water and wherein such collecting means are provided with adjustable wings which may be extended some distance below the body proper.

A still further object is the provision of a device of the class described wherein the current-actuated parts of the device may be elevated above the water level and adjusted at various depths below the level of the water in the stream.

These and other objects and advantages of the invention will be more fully set forth in the following description made in connection with the accompanying drawing, in which like reference characters refer to similar parts throughout the several views, and in which:—

Fig. 1 is a plan view of an embodiment of my invention mounted for operation;

Fig. 2 is a vertical section taken on the line 2—2 of Fig. 1, and

Fig. 3 is a detail view showing one manner in which the endless current-actuated element including the paddles may be constructed.

In the embodiment of the invention illustrated, a buoyant body is provided in the form of a pair of spaced pontoons 5 which may be hollow air-filled tanks or if desired buoyant timbers spaced apart and secured together as shown by cross bars 6 adjacent the rear and forward ends of the body. The pontoons 5 are spaced in parallel relation and have substantially vertical opposing and inner walls 5a which define a sluice-way. At the forward ends of the body the pontoons 5 are tapered at their inner sides along the walls 5b, the tapered walls 5b of the two pontoons forming a converging entrance or current collector for the sluice. If desired the collector portions at the forward ends of the pontoons may be extended beyond the proportions shown in the drawing or removable extension wings may be provided creating a larger mouth or entrance portion for the sluice. To facilitate in the collection of moving water and its guidance to and through the sluice, I may provide adjustable skirt plates 7 disposed as shown flush against the inner converging walls of the pontoons and adjustably supported as shown by flexible straps 8 which may engage pins 8a secured to the top of the pontoons adjacent the forward ends thereof. The skirt plates 7 may be, if desired, constructed of metal and as shown, extend along the converging entrance portions as well as throughout the entire lengths of the inner walls of the pontoons 5.

An angular drift guard 9 is secured to the forward ends of the pontoons 5 and as shown comprises spaced bars forming an angular rack and disposed, when in operation, in vertical position with the apex of the angle in the bow or forward position of my construction headed into the stream. The body may be moored in the stream by any suitable means such as cables 10 which may be secured to heavy rings 11 fixed to the forward portions of the pontoons. Within the sluice-way and occupying substantially the full width between the opposing walls 5a of the pontoons, I provide an endless current-actuated element E which is trained about suitable rotary members supported from the pontoons. As shown the current-actuated element consists in a pair of endless chains 12 each of which is trained about a large rear sprocket 13 and a relatively small front sprocket 14, the two sprockets 13 being mounted on a shaft 15 which traverses the two pontoons 5 and is mounted in suitable blocks 16 at the ends thereof. The smaller sprockets 14 at the forward ends of the chains are fixed to a power take-off shaft 17 which is journaled in suitable block bearings 18 and as shown a power take-off pulley 19 is fixed to an extended end of the power take-off shaft 17. Suitable belt tightening means are provided to keep the endless element E necessarily taut and as shown a pair of turnbuckle rods 20 are provided, one connected with each of the blocks 16 for the rear shaft and connected at their other ends to parts of the frame structure at the rear of the pontoons.

When the endless current-actuated element E is disposed in operative position, as shown, the bearings 18 and the blocks 16 rest solidly upon the top of the pontoons 5 and some distance above the water level L. The lower runs of the chains 12 are then inclined with respect to the water level, inclining from their rearward portion to their forward portions, which are trained about the sprockets 14. I provide a series of transverse paddles 22 connected between the two endless chains 12 and shaped in the manner clearly shown in Figs. 1 and 3. These paddles may be cast from non-corrosive metal or may be constructed of wood or other suitable material and are preferably provided with attachment ears 22a which are pivoted to the inner sides of the spaced chains 12, the bodies of the paddles extending somewhat beyond the chains and serving as abutment means at their inner edges to prevent swinging of the paddles past the position shown in Fig. 3.

As clearly shown in the drawing, gravity causes the paddles 22 to drop into normal position perpendicular to the inclined lower run of the element E as the paddles pass the front of the sprockets 14. The paddles as they move with the endless actuated member about the larger sprockets 13 swing by gravity into compact position against the chains 12 and thus remain until they reach the front of the sprockets 14 with a feathering action offering no obstruction to wind currents.

I provide a superstructure or upright frame upon the body of my device to enable the current actuated element to be adjustably elevated and to further permit the drift guard to be raised. As shown this superstructure comprises a series of upright posts 23 disposed on opposite sides of the buoyant body and connected together at their tops by beams 24 which beams are in turn rigidly connected together by stringer members 25. The superstructure is braced by suitable means such as the stays 26 at the front and rear of the device. A block and tackle mechanism 27, as shown, is provided for elevating the blocks 16 wherein the rear sprocket shaft 15 is mounted and this may be connected to the intermediate portion of shaft 15 to adjustably elevate this shaft and sprockets 13. The block and tackle mechanism 27 is connected at its upper end with a suitable eye 28 secured to one of the stringer members 25 at the top of the superstructure.

A pair of block and tackle mechanisms 29 are provided for adjustably elevating the bearings 18 for the forward sprocket shaft 17 and these block and tackle mechanisms are connectible with the bearings and have their upper ends connected with another of the stringer members 25 disposed adjacent the forward portion of the superstructure.

The drift guard 9 is preferably hinged to the forward ends of the pontoons 5 and may be quickly raised by means of a winch mechanism 30 which winds a rope or cable 31 trained over a pulley 32 which is connected with the top of the superstructure at its forward end.

In operation the device is moored in a river or stream by suitable means such as cables 10 which are secured to heavy anchors or to posts or other means on shore and the forward end of the body, of course, is headed upstream and in a position selected where the current is as rapid as can be obtained. The current collecting skirts at the forward ends of the pontoons forming the wide converging entrance portion directs the moving flow of water between the pontoons 5 and into the sluice-way defined by the vertical side walls 5a of the pontoons. The skirt plates 7 of the collector skirts may be lowered as far as practicable to assist in directing a greater flow of moving water through the sluice.

It will be observed that since the lower run of the endless current actuated element is inclined with reference to the level of the water from its rear portion to its front portion that is, between the rear and forward sprockets 13 and 14, respectively, that the moving stream of water will exert its force against a number of the paddles simultaneously and in the most efficient manner as contrasted with an endless element disposed horizontally and parallel to the level of the moving stream.

It will further be seen that the bearings, shafts and working parts of the device, with the exception of the chains, which are preferably constructed of non-corrosive metal, are all disposed above the water level and that the water level is preferably some short distance below the top of pontoons 5.

The actuated or lower run of the element E may be adjusted for depth or height by means of the block and tackle mechanisms 27 and 29 and when it is desired to move the device the entire current-actuated element may be elevated above the top of the pontoons.

Drift wood and floating objects are deflected to the sides of the body by means of the drift guard 9 and cannot enter the sluice-way.

From the foregoing description it will be seen that I have invented a simple and highly efficient water current motor which may be readily moved from place to place in a stream as water and current conditions vary and which may be readily hauled up on shore or transported from one stream to another.

The power developed may, of course, be utilized in any conventional way, such as, for example, pumping water from the stream for irrigation purposes.

It will, of course, be understood that various changes may be made in the form, details, arrangement and proportions of the parts, without departing from the scope of my invention, which generally stated, consists in a device capable of carrying out the objects above set forth and in the novel parts and combinations of parts disclosed and defined in the appended claim.

What is claimed is:

In water current motor construction, a pair of spaced pontoons adapted to be moored in a moving stream of water, means connecting said pontoons in spaced relation, said pontoons having substantially parallel opposing walls partially defining an open bottomed sluice in said stream, said pontoons also having upstanding opposed but diverging walls at their forward ends partially defining an entrance portion for said sluice, vertically adjustable extensions to said substantially parallel walls and vertically adjustable extensions to said upstanding diverging walls, said extensions cooperating with said respective walls to define said sluice, and said pontoons furnishing a support for an endless water driven member.

GEORGE W. WISE.